US012192280B2

(12) United States Patent
Tong et al.

(10) Patent No.: US 12,192,280 B2
(45) Date of Patent: Jan. 7, 2025

(54) RELIABLE AND HIGH-PERFORMANCE CONNECTIVITY BETWEEN CONTROL-PLANES AND DATA-PLANES FOR A DATA MANAGEMENT SYSTEM

(71) Applicant: Rubrik, Inc., Palo Alto, CA (US)

(72) Inventors: Charlotte Tong, Menlo Park, CA (US); David Anthony Terei, New York, NY (US); Jonathan Carlyle Derryberry, Union City, CA (US); Jun Xu, Seattle, WA (US); Vinay Patil, Santa Clara, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 18/320,603

(22) Filed: May 19, 2023

(65) Prior Publication Data

US 2024/0388625 A1 Nov. 21, 2024

(51) Int. Cl.
*H04L 12/00* (2006.01)
*H04L 9/40* (2022.01)
*H04L 45/74* (2022.01)
*H04L 67/1014* (2022.01)
*H04L 67/1097* (2022.01)
*H04L 67/563* (2022.01)

(52) U.S. Cl.
CPC .......... *H04L 67/1097* (2013.01); *H04L 45/74* (2013.01); *H04L 63/20* (2013.01); *H04L 67/1014* (2013.01); *H04L 67/563* (2022.05)

(58) Field of Classification Search
CPC ..... H04L 67/1097; H04L 45/74; H04L 63/20; H04L 67/1014; H04L 67/563

USPC .......................................................... 709/217
See application file for complete search history.

(56) References Cited

U.S. PATENT DOCUMENTS

| | | | | |
|---|---|---|---|---|
| 7,088,540 | B2 * | 8/2006 | Suzuki | G06F 3/0634 |
| 7,191,287 | B2 * | 3/2007 | Nonaka | G06F 3/067 |
| | | | | 709/216 |
| 8,032,776 | B2 * | 10/2011 | Merkin | G06F 1/28 |
| | | | | 713/340 |
| 8,468,300 | B2 * | 6/2013 | Kano | G06F 3/0659 |
| | | | | 711/113 |
| 11,921,555 | B2 * | 3/2024 | Olarig | G06F 1/3215 |

(Continued)

FOREIGN PATENT DOCUMENTS

CN 109727135 A * 5/2019
CN 116010084 A * 4/2023

*Primary Examiner* — Frantz Coby
(74) *Attorney, Agent, or Firm* — Holland & Hart LLP

(57) ABSTRACT

Methods, systems, and devices for data management are described. A data management system may include a control-plane common to multiple customers, where customer data for each customer is stored on a private data plane (e.g., at a remote node cluster). Each node cluster includes a controller which manages the nodes of the node cluster. A taskchain controller of the control plane may directly communicate with the nodes of the multiple node clusters, for example, via respective proxy services hosted at the node controllers or via respective service buses. The taskchain controller may communicate a command to add a new node to the node controller, and the node controller may create a new node based on the command. Future communications (e.g., commands to perform data protection tasks such as backup or restore operations) may be routed to the node via the proxy service or a service bus.

20 Claims, 10 Drawing Sheets

(56) References Cited

U.S. PATENT DOCUMENTS

| | | | |
|---|---|---|---|
| 2018/0067672 A1* | 3/2018 | De Spiegeleer | G06F 3/0625 |
| 2021/0168197 A1* | 6/2021 | Jones | H04L 45/24 |
| 2022/0303335 A1* | 9/2022 | Jones | H04L 45/02 |
| 2023/0288976 A1* | 9/2023 | Fujita | G06F 1/329 |

* cited by examiner

RELIABLE AND HIGH-PERFORMANCE CONNECTIVITY BETWEEN CONTROL-PLANES AND DATA-PLANES FOR A DATA MANAGEMENT SYSTEM

FIELD OF TECHNOLOGY

The present disclosure relates generally to data management, including techniques for reliable and high-performance connectivity between control-planes and data-planes for a data management system.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

In some data management system (DMS) architectures, the control-plane may common to multiple customers or tenants. Each customer/tenant may have a private data-plane. A data-plane may include a set of virtual machines, which may also be referred to as a node cluster (e.g., virtual machines may also be referred to as nodes), across which customer or tenant data is stored. Each node cluster includes a controller which manages the nodes of the node cluster. Separating each customer/tenant's data into separate node clusters provides fault isolation for the different customers/tenants and provides security by limiting access to data for each customer/tenant. Node clusters may be hosted externally (e.g., on Microsoft Azure). The control-plane manages tasks, such as storing backups or snapshots or performing restorations, across the multiple node clusters. The control plane may include a DMS. A single service at the control-plane may communicate tasks queued by the control-plane taskchain (also referred to as a taskchain controller) with the various node cluster controllers. The control-plane may manage thousands of node clusters, and thousands of tasks per node cluster. Use of a single additional service at the control-plane to communicate between the taskchain controller and the various node controllers, therefore, may result in high latency and may introduce a single point of failure for all of the node clusters.

Aspects of the present disclosure involve techniques for direct communication between the taskchain controller of the control plane and the multiple node clusters. In some aspects, each node cluster may include a proxy service that is directly accessible by the taskchain controller based on the network address of the proxy service. The proxy service may route communications (e.g., transmission control protocol (TCP) packets) between the taskchain controller and the nodes of the node cluster. For example, the proxy service may be deployed at the node controller for the node cluster. For a given node cluster, the taskchain controller may communicate a command to add a new node to the node controller, and the node controller may create a new node based on the command. The proxy service may route communications between the node and the taskchain controller. In some aspects, a service bus may be created for a node cluster. The service bus may be deployed onto one of the nodes of the node cluster, and may be directly accessible by the taskchain controller. After creation of a node, communications may be routed between the taskchain of the control-plane and the node via the service bus (e.g., in a queued manner). A service bus and a proxy service may coexist on the same node cluster, and the taskchain controller may communicate some tasks via the proxy service and some tasks via the service bus, for example, based on priority or traffic conditions.

Figure 1:
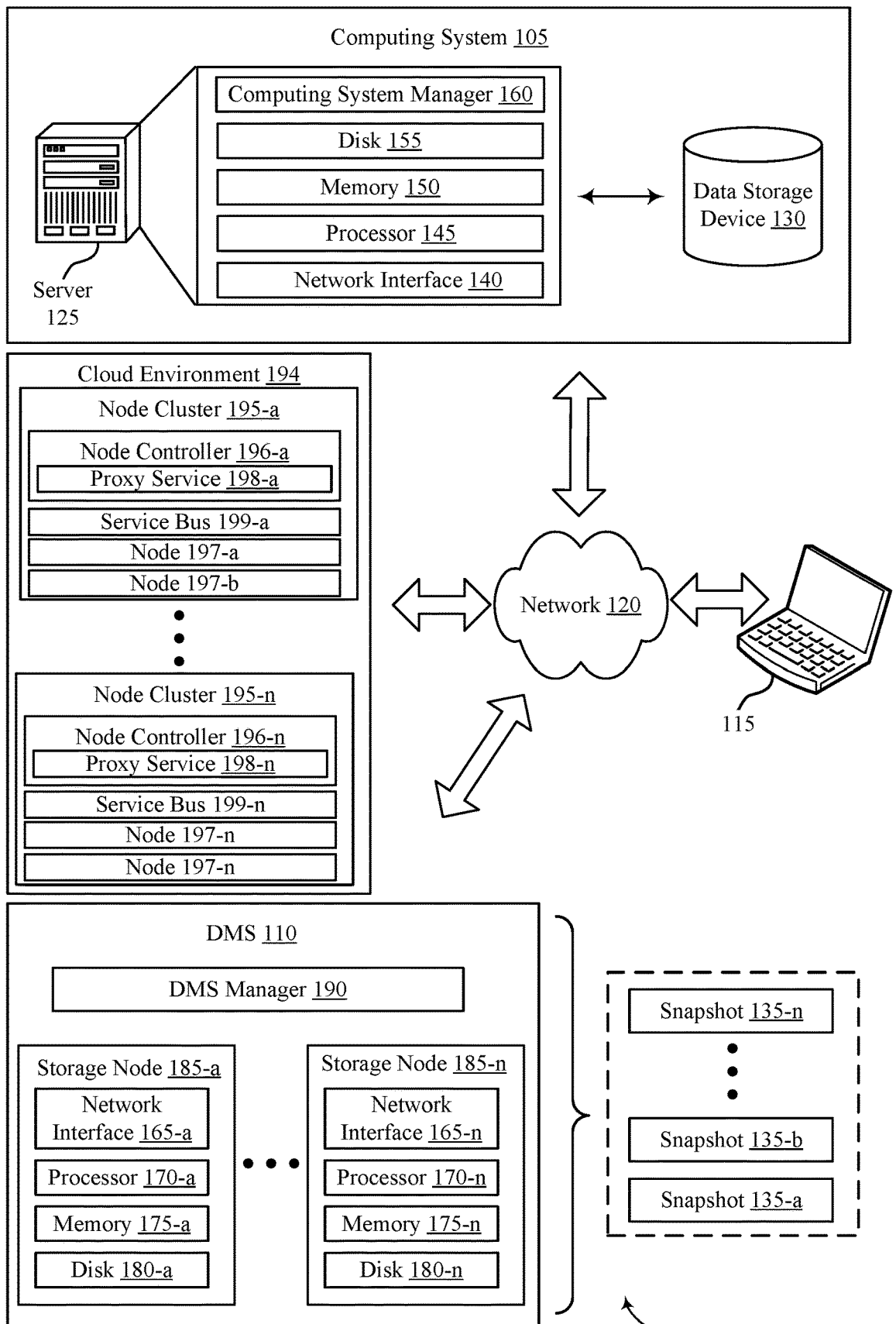
FIG. 1 illustrates an example of a computing environment that supports reliable and high-performance connectivity between control-planes and data-planes for a data management system in accordance with aspects of the present disclosure.

FIG. 1 illustrates an example of a computing environment 100 that supports reliable and high-performance connectivity between control-planes and data-planes for a DMS in accordance with aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In the DMS 110, the control-plane may be common to multiple customers/tenants. Each customer/tenant may have a private data-plane. For example, as described herein, the DMS 110 may transfer snapshots 135 via the network 120 to a cloud environment 194. Each customer/tenant may have a private cloud environment (e.g., Microsoft Azure) which includes a node cluster 195. across which customer or tenant data is stored. Each node cluster 195 includes a node controller 196 which manages the nodes 197 of the node cluster 195. Separating each customer/tenant's data into separate node clusters 195 provides fault isolation for the different customers/tenants and provides security by limiting access to data for each customer/tenant. Node clusters 195 may be hosted externally (e.g., on Microsoft Azure). The control-plane (e.g., the DMS, and specifically the DMS manager 190) manages tasks, such as storing backups or snapshots or performing restorations, across the multiple node clusters 195. A single service at the control-plane may communicate tasks queued by the control-plane taskchain (also referred to as a taskchain controller) with the various node controllers 196. For example, the taskchain controller may be the DMS manager 190 as described herein. The control-plane may manage thousands of node clusters 195, and thousands of tasks per node cluster 195. Use of a single additional service at the control-plane to communicate between the taskchain controller and the various node controllers 196, therefore, may result in high latency and may introduce a single point of failure for all of the node clusters 195.

The taskchain controller of the control plane (e.g., the DMS manager 190) may directly communicate with the multiple node clusters 195. In some aspects, each node cluster 195 may include a proxy service 198 that is directly accessible by the taskchain controller, based on the network address of the proxy service 198. The proxy service 198 may route communications (e.g., TCP packets) between the taskchain controller (e.g., the DMS manager 190) and the nodes 197 of the node cluster 195. For example, the proxy service 198 may be deployed at the node controller 196 for the node cluster 195. For a given node cluster 195, the taskchain controller may communicate a command to add a new node 197 to the node controller 196, and the node controller 196 may create a new node 197 based on the command. The proxy service 198 may route future communications between the node 197 and the taskchain controller. In some aspects, a service bus 199 may be created for a node cluster 195. The service bus 199 may be deployed onto one of the nodes of the node cluster 195, and may be directly accessible by the taskchain controller. After creation of a node 195, communications may be routed between the taskchain of the control-plane and the node 197 via the service bus 199 (e.g., in a queued manner). A service bus 199 and a proxy service 198 may coexist on the same node cluster 195, and the taskchain controller may communicate some tasks via the proxy service 198 and some tasks via the service bus 199, for example, based on priority or traffic conditions.

Figure 2:
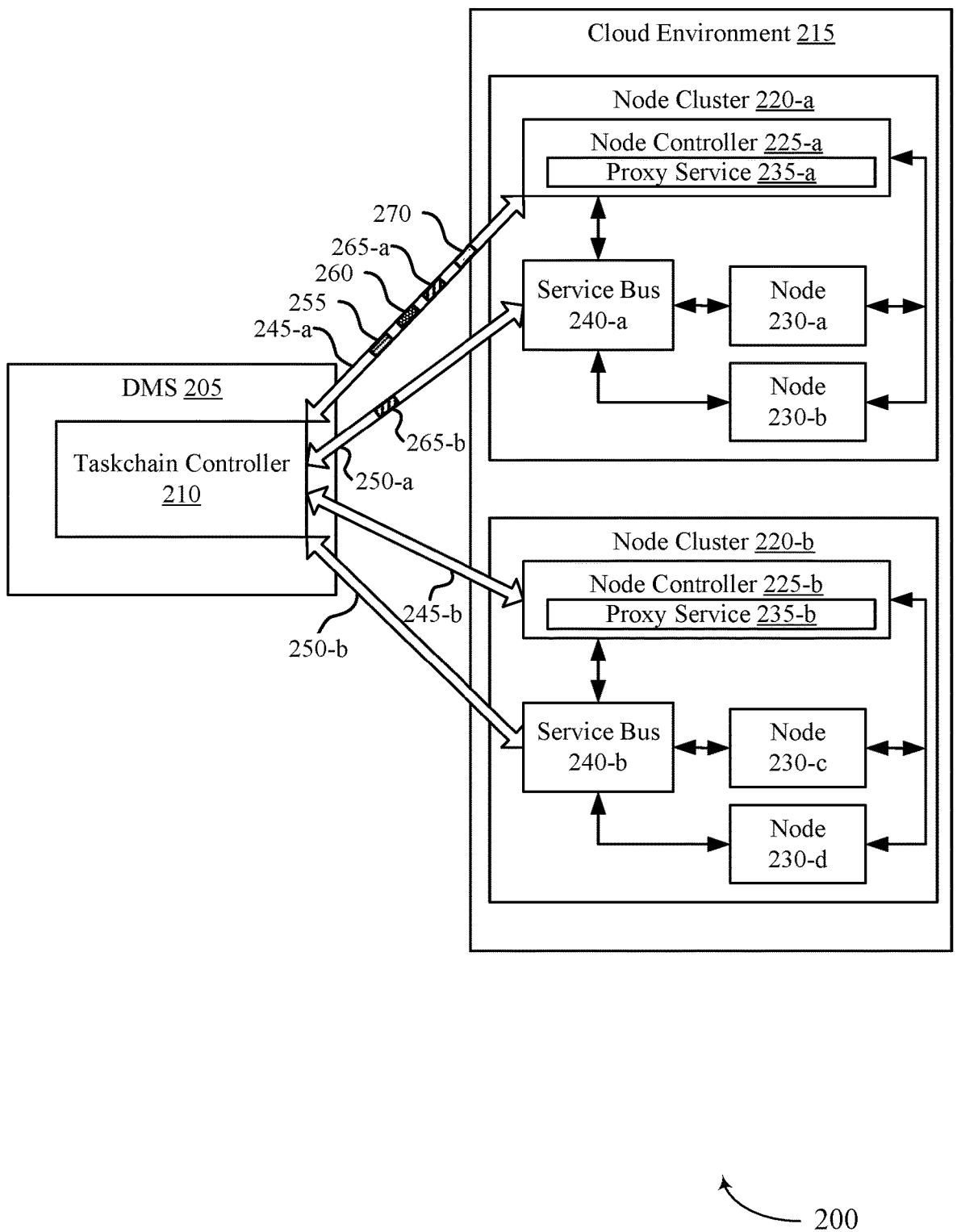
FIG. 2 shows an example of a computing environment that supports reliable and high-performance connectivity between control-planes and data-planes for a data management system in accordance with aspects of the present disclosure.

FIG. 2 shows an example of a computing environment 200 that supports reliable and high-performance connectivity between control-planes and data-planes for a DMS in accordance with aspects of the present disclosure. The computing environment 200 may implement or be implemented by aspects of the computing environment 100 described with reference to FIG. 1.

As described herein, a DMS 205 may be common to multiple customers/tenants. The DMS may manage data protection tasks for the multiple customers/tenants. Each customer/tenant may have a private data-plane at a cloud environment 215. Each private data plane may include node cluster 220 (e.g., data for a first customer/tenant is stored at the node cluster 220-a and data for a second customer/tenant is stored at the node cluster 220-b). Each node cluster includes a node controller 225 (e.g., the node cluster 220-a includes a node controller 225-a and the node cluster 220-b includes a node controller 225-b). The node controller 225 manages the nodes 230 (e.g., virtual machines). For example, the node cluster 220 may be a Microsoft Azure Kubernetes Service (AKS) cluster, and the node controller 225 may be a AKS application programming interface (API). Customer/tenant data (e.g., backup data and snapshots) may be stored across the nodes 230. Although two node clusters are shown (e.g., the node cluster 220-a and the node cluster 220-b), the DMS 205 may support thousands of node clusters for thousands of customers/tenants. The DMS 205 may support low-latency, high-throughput communications with the node clusters 220.

A taskchain controller 210 at the DMS may queue data protection tasks (e.g., read and/or write operations) for the multiple node clusters 220. As described herein, the taskchain controller 210 may establish a direct connection 245 with the node controller 225 of each node cluster (e.g., a direct connection 245-a with the node controller 225-a and a direct connection 245-b with the node controller 225-b). For example, the direct connection 245 may be established based on the network address of the node controller 225 (e.g., when the node controller 225 is an API). For example, the direct connection 245 may be an HTTP connection. In some examples, the direct connection may be a remote procedure call (RPC) tunnel between the taskchain controller 210 and the node controller 225. The node controller may communicate with the nodes 230. DMS 205 may manage thousands of data protection tasks per node cluster 220, and accordingly across thousands of node clusters 220, the DMS 205 may manage millions of connections and tasks. High throughput may be demanded for small messages.

The taskchain controller 210 may transmit a request 255 via the direct connection 245-a to the node controller 225-a to add a node. In response to the request 255, the node controller 225-a may add a node (e.g., the node 230-a). The node controller 225-a may indicate in a control message 260 an identifier (e.g., a port number or a node index) for the node 230-a. The taskchain controller 210 may identify a network address for routing a data protection task commands to the node 230-a. For example, the node cluster may include a proxy service 235-a at the node controller which routes data protection tasks 265 to nodes 230 based on port numbers or node indexes. The proxy service 235-a may be an intermediate machine (e.g., the node controller 225-a). The proxy service 235-a has access to the nodes (e.g., the node 230-a and the node 230-b as shown in FIG. 2). In some examples, the proxy service 235-a may be hosted on a machine or virtual machine other than the node controller 225-a. The machine on which the proxy service 235-a is hosted has access to the nodes 230 of the node cluster 220-a in order to route data protection tasks to the nodes 230. The proxy service 235-a may be directly accessible by the taskchain controller 210 (e.g., the network address of the proxy service 235-a may be known to the taskchain controller 210 such that the taskchain controller 210 can establish an HTTP connection with the proxy service 235-a). For example, the taskchain controller 210 may establish an RPC tunnel with the node controller 225-*a* based on the network address of the node controller 225-*a*, and the proxy service 235-*a* may be hosted on the node controller 225-*a*. The data protection tasks may be communicated as TCP packets. The proxy service 235-*a* may accept TCP packets from the taskchain controller 210 and routes the TCP packets to the indicated nodes 230 of the node cluster 220-*a* (e.g., based on a node identifier, node index, or a port number indicated by the taskchain controller 210 with the TCP packets). Use of a proxy service 235-*a* may provide a simple and low-cost solution, as a node controller 225 is already provided per node cluster 220. Use of a proxy service 235 allows nodes 230 to remain private/transparent to the DMS 205 and the taskchain controller 210, thereby increasing security. As the node controller can have heavy traffic conditions, at times scalability may affect the performance of a proxy service implementation.

As another example, the node cluster 220-*a* may include a service bus 240-*a*. The service bus 240-*a* may be hosted on a node 230 of the node cluster 220. The taskchain controller 210 may establish a direct connection 250-*a* with the service bus 240-*a*. For example, the node controller 225-*a* may create the service bus 240-*a* and transmit a control message 270 to the taskchain controller 210 which indicates the network address for the service bus 240-*a*. The taskchain controller 210 may establish a direct connection 250-*a* with the service bus 240-*a* using the network address for the service bus 240-*a* (e.g., an HTTP connection). In some examples, the direct connection 250-*a* with the service bus 240-*a* may be an RPC tunnel between the taskchain controller 210 and the service bus 240-*a*. The service bus 240-*a* may route data protection task commands 265 to nodes 230 based on port numbers or node indexes for the respective nodes. The service bus 240-*a* may have improved performance and scalability as compared to the proxy service 235-*a*. The taskchain controller 210 may send TCP packets to the service bus 240-*a* for relay onto the target nodes as individual messages in a queue. Deploying the service bus 240-*a* onto a node of the node cluster 220-*a* as compared to the node controller 225-*a* may reduce scalability and traffic issues associated with the proxy service approach. The service bus approach exposes one of the nodes of the node cluster 220-*a* to the taskchain controller 210. Use of a node at the node cluster as a service bus 240-*a* may involve increase resource usage as compared to the proxy service approach.

In some examples, a proxy service 235-*a* and a service bus 240-*a* may coexist at a node cluster 220-*a*. For example, the taskchain controller 210 may route data protection tasks 265-*a* through the proxy service 235-*a* for lower priority tasks that do not demand high performance or low latency and may route data protection tasks 265-*b* through the service bus 240-*a* for higher priority tasks or tasks that demand high performance or low latency. As another example, the taskchain controller 210 may route data protection tasks 265 through the proxy service 235-*a* or through the service bus 240-*a* based on traffic conditions at the node controller 225-*a* (e.g., the proxy service 235-*a* may be used for low traffic conditions at the node controller 225-*a* and the service bus 240-*a* may be used for high traffic conditions at the node controller 225-*a*). In some examples, a service bus 240-*a* may be created or terminated based on traffic conditions at the node controller 225-*a*. In some examples, the taskchain controller 210 may request creation of a service bus 240, for example, for routing of high priority data protection tasks or for routing of data protection tasks that demand high performance or low latency.

As described herein, the taskchain controller 210 may manage data protection tasks for the multiple customers/tenants of the DMS 205. Accordingly, the taskchain controller 210 may similarly establish a direct connection 245-*b* with the node controller 225-*b* of a second node cluster 220-*b* associated with a second customer/tenant and/or a direct connection 250-*b* with a service bus 240-*b* of the second node cluster 220-*b*. The taskchain controller 210 may route data protection tasks to nodes (e.g., node 230-*c* and node 230-*d*) of the node cluster 220-*b* via a proxy service 235-*b* or a service bus 240-*b* at the node cluster 220-*b*.

As the service bus 240 uses a message oriented architecture, the service bus 240-*a* may allow asynchronous communication between the control plane (e.g., DMS 205 and the taskchain controller 210) and the data plane (e.g., the nodes 230 of the node clusters 220) managed by the control plane. Asynchronous communication allows for efficient processing as neither the control node the data plane waits for the other side to respond, which may lead to improved ability to handle peak traffic and may lead to improved scalability and reliability for the DMS 205. The queue solution used by the service bus 240 may provide message persistence, ensuring that messages are not lost in the event of a system failure. In some examples, the service bus 240 may report performance statistics, and accordingly the DMS 205 may monitor the performance of the communication between the data plane and the control plane.

Use of the service bus 240 or a proxy service 235 to route data protection tasks between the taskchain controller 210 and the nodes 230 provides the ability to maintain firewalls at the node clusters 220 and to maintain the private nature of the node clusters. For example, an RPC tunnel between the taskchain controller 210 and the node controller 225 or the service bus 240 of a node cluster does not punch a hole in the customer or tenant's firewall for the node cluster 220. Use of the HTTP connection with the proxy service 235 or the service bus, while keeping the remaining nodes private, may increase security and customer/tenant privacy, and may ensure that authorized traffic is routed correctly while ensuring that unauthorized traffic is not allowed to flow between the control and data planes. The service bus 240 or a proxy service 235 may use built in Kubernetes mechanisms for load balancing and failover, allowing for high availability and ease of integration. The service bus 240 or a proxy service 235 may provide for load balancing by routing traffic across nodes 230 to ensure resource utilization across the node clusters. Deployment at the node controller or as a node of a node cluster may promote decentralization and thereby eliminate single points of failure.

Figure 3:
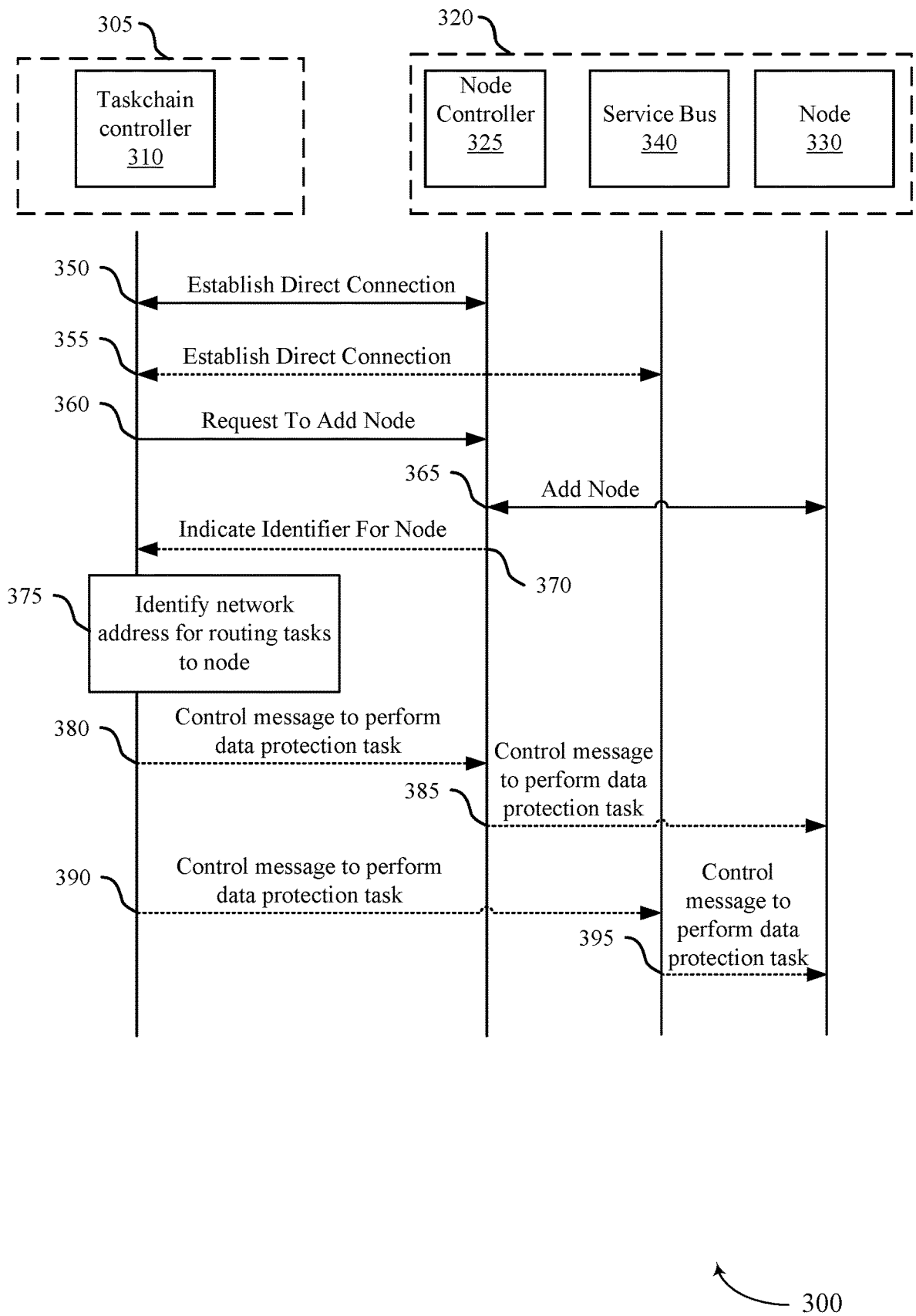
FIG. 3 shows an example of a process flow that supports reliable and high-performance connectivity between control-planes and data-planes for a data management system in accordance with aspects of the present disclosure.

FIG. 3 shows an example of a process flow 300 that supports reliable and high-performance connectivity between control-planes and data-planes for a DMS in accordance with aspects of the present disclosure. The process flow 300 may implement or be implemented by aspects of FIGS. 1-2. For example, the process flow 300 includes a DMS 305, which may be an example of a DMS 110 or a DMS 205 as described herein. The DMS 305 may include a taskchain controller 310, which may be an example of a taskchain controller 210 as described herein. The process flow 300 may include a node cluster 320, which may be an example of a node cluster 220 as described herein. The node cluster 320 may include a node controller 325, which may be an example of a node controller 225 as described herein. The node cluster 320 may include a node 330, which may be an example of a node 230 as described herein. The node cluster 320 may include a service bus 340 which may be an example of a service bus 240 as described herein.

In the following description of the process flow 300, the operations between the taskchain controller 310, the node controller 325, the node 330, and the service bus 340 may be transmitted in a different order than the example order shown, or the operations performed by the taskchain controller 310, the node controller 325, the node 330, and the service bus 340 may be performed in different orders or at different times. Some operations may also be omitted from the process flow 300, and other operations may be added to the process flow 300. The taskchain controller 310 may schedule data protection tasks for multiple node clusters including the node cluster 320, and each node cluster may be associated with a tenant or customer of the DMS 305.

At 350, the taskchain controller 310 may establish a direct connection with the node controller 325 based on a network address of the node controller.

In some examples, at 355, the taskchain controller 310 may establish a direct connection with a service bus 340 of the node cluster based on a network address of the service bus 340. For example, the node controller 325 may indicate the network address of the service bus 340 to the taskchain controller 310.

At 360, the taskchain controller 310 may send a request to the node controller 325 to add a node 330 to the node cluster 320. At 365, the node controller 325 may add the node 330 to the node cluster 320 in response to the request. In some examples, at 370, the node controller may indicate an identifier for the node 330 (e.g., a port, a node index, or a node identifier) that the taskchain controller 310 may use to identify the node in subsequent data protection task commands.

At 375, the taskchain controller 310 may identify a network address (e.g., the network address for the node controller 325 or the network address for the service bus 340) via which to route data protection tasks from the taskchain controller 310 to the node 330.

In some examples, at 380, the taskchain controller 310 may send a control message to the node controller 325 (e.g., to a proxy service at the node controller 325) indicating for the node 330 to perform a data protection task. The control message may indicate an identifier for the node 330 (e.g., the identifier indicated at 370). At 385, the node controller 325 (e.g., a proxy service at the node controller 325) may route the control message indicating to perform data management task to the node 330. In some examples, the node controller 325 may indicate to the taskchain controller 310 that the node controller hosts a proxy service that may route control messages indicating for the node 330 to perform a data protection task to the node 330.

In some examples, at 390, the taskchain controller 310 may send a control message to the service bus 340 indicating for the node 330 to perform a data protection task. The control message may indicate an identifier for the node (e.g., the identifier indicated at 370). At 395, the service bus 340 may route the control message indicating to perform data management task to the node 330.

In some examples, a proxy service at the node controller 325 may coexist with the service bus 340. The taskchain controller 310 may route data protection tasks through the proxy service for lower priority tasks that do not demand high performance or low latency and may route data protection tasks through the service bus 340 for higher priority tasks or tasks that demand high performance or low latency. As another example, the taskchain controller 310 may route data protection tasks through the proxy service or through the service bus 340 based on traffic conditions at the node controller 325 (e.g., the proxy service may be used for low traffic conditions at the node controller 325 and the service bus 340 may be used for high traffic conditions at the node controller 325). In some examples, a service bus 240-a may be created or terminated based on traffic conditions at the node controller 325). In some examples, the taskchain controller 310 may request creation of a service bus, for example, for routing of high priority data protection tasks or for routing of data protection tasks that demand high performance or low latency.

In some examples, the taskchain controller 310 may send a request to the node controller 325 to add the service bus 340 to the node cluster, for example based on identifying that a traffic load at the node controller 325 exceeds a threshold. In some examples, the node controller 325 may add the service bus 340 to the node cluster 320 based on the node controller 325 identifying that a traffic load at the node controller 325 exceeds a threshold. In some examples, the taskchain controller 310 may send a request to the node controller 325 to remove the service bus 340 based on identifying that the traffic load at the node controller 325 is below a threshold, and in response, the node controller 325 may terminate the service bus 340. In some examples, the node controller 325 may terminate the service bus 340 in response to the node controller 325 identifying that the traffic load at the node controller 325 is below a threshold. The node controller 325 may indicate to the taskchain controller 310 when the service bus 340 is added to the node cluster 320 or terminated.

In some examples, the taskchain controller 310 may send a request to the node controller 325 to add a second node to the node cluster 320. The taskchain controller 310 may receive, from the node controller 325 in response to the request, an indication of a second node identifier for the second node (e.g., a second port, a second node identifier, or a second node index). The taskchain controller 310 may send a control message to the node controller 325 or to the service bus 340 that indicates for the second node to perform a data protection task, and the control message may include the second node identifier. The node controller 325 (e.g., the proxy service) or to the service bus 340 may route the control message that requests the second node to perform the data protection task to the second node based on the control message including the second node identifier.

Figure 4:
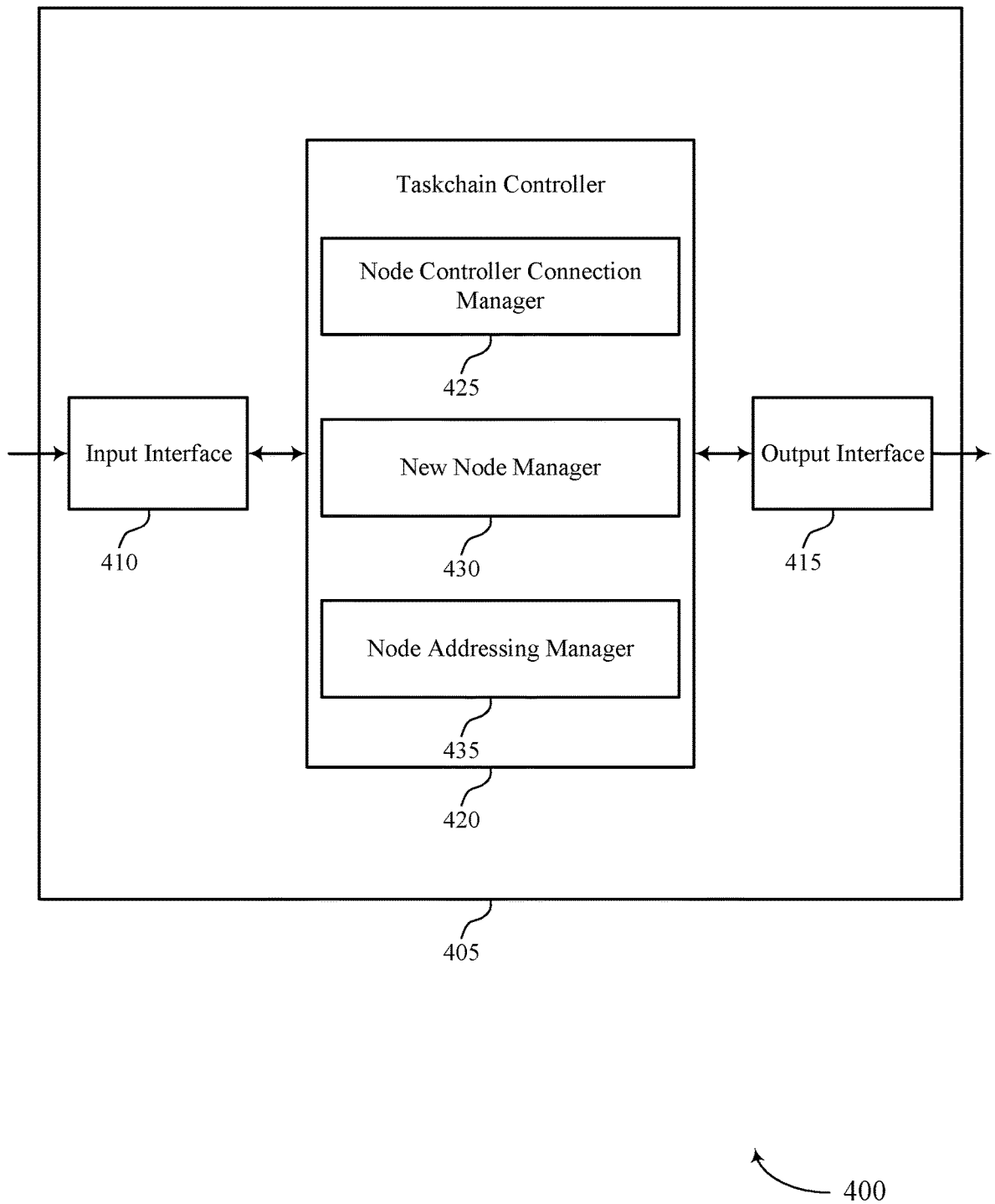
FIG. 4 shows a block diagram of an apparatus that supports reliable and high-performance connectivity between control-planes and data-planes for a data management system in accordance with aspects of the present disclosure.

FIG. 4 shows a block diagram 400 of a system 405 that supports reliable and high-performance connectivity between control-planes and data-planes for a DMS in accordance with aspects of the present disclosure. In some examples, the system 405 may be an example of aspects of one or more components described with reference to FIG. 1, such as a DMS 110. The system 405 may include an input interface 410, an output interface 415, and a taskchain controller 420. The system 405 may also include one or more processors. Each of these components may be in communication with one another (e.g., via one or more buses, communications links, communications interfaces, or any combination thereof).

The input interface 410 may manage input signaling for the system 405. For example, the input interface 410 may receive input signaling (e.g., messages, packets, data, instructions, commands, or any other form of encoded information) from other systems or devices. The input interface 410 may send signaling corresponding to (e.g., representative of or otherwise based on) such input signaling to other components of the system 405 for processing. For example, the input interface 410 may transmit such corresponding signaling to the taskchain controller 420 to support reliable and high-performance connectivity between control-planes and data-planes for a DMS. In some cases, the input interface 410 may be a component of a network interface 625 as described with reference to FIG. 6.

The output interface 415 may manage output signaling for the system 405. For example, the output interface 415 may receive signaling from other components of the system 405, such as the taskchain controller 420, and may transmit such output signaling corresponding to (e.g., representative of or otherwise based on) such signaling to other systems or devices. In some cases, the output interface 415 may be a component of a network interface 625 as described with reference to FIG. 6.

For example, the taskchain controller 420 may include a node controller connection manager 425, a new node manager 430, a node addressing manager 435, or any combination thereof. In some examples, the taskchain controller 420, or various components thereof, may be configured to perform various operations (e.g., receiving, monitoring, transmitting) using or otherwise in cooperation with the input interface 410, the output interface 415, or both. For example, the taskchain controller 420 may receive information from the input interface 410, send information to the output interface 415, or be integrated in combination with the input interface 410, the output interface 415, or both to receive information, transmit information, or perform various other operations as described herein.

The node controller connection manager 425 may be configured as or otherwise support a means for establishing, at a taskchain controller of a DMS, a direct connection between the taskchain controller and a node controller of a first node cluster of a set of multiple node clusters, where the direct connection is based on a first network address of the node controller, where the set of multiple node clusters are associated with a respective set of multiple tenants of the DMS, where the taskchain controller of the DMS is operable to schedule data protection tasks for the set of multiple node clusters. The new node manager 430 may be configured as or otherwise support a means for sending, from the taskchain controller to the node controller via the direct connection, a request to add a node to the first node cluster. The node addressing manager 435 may be configured as or otherwise support a means for identifying, based on sending the request, a second network address associated with the first node cluster via which to route one or more data protection tasks from the taskchain controller to the node.

Figure 5:
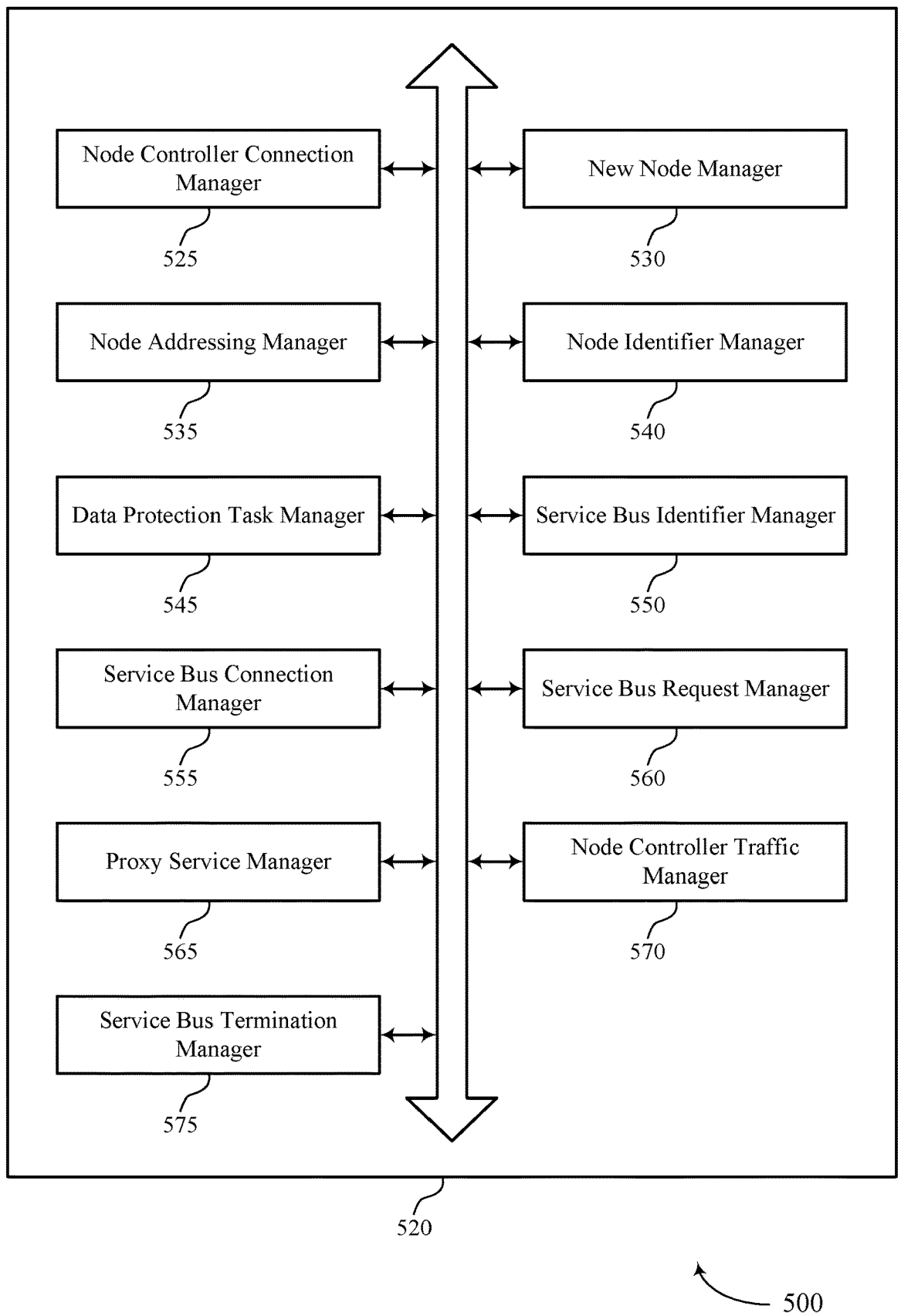
FIG. 5 shows a block diagram of a taskchain controller that supports reliable and high-performance connectivity between control-planes and data-planes for a data management system in accordance with aspects of the present disclosure.

FIG. 5 shows a block diagram 500 of a taskchain controller 520 that supports reliable and high-performance connectivity between control-planes and data-planes for a DMS in accordance with aspects of the present disclosure. The taskchain controller 520 may be an example of aspects of a taskchain controller or a taskchain controller 420, or both, as described herein. The taskchain controller 520, or various components thereof, may be an example of means for performing various aspects of reliable and high-performance connectivity between control-planes and data-planes for a DMS as described herein. For example, the taskchain controller 520 may include a node controller connection manager 525, a new node manager 530, a node addressing manager 535, a node identifier manager 540, a data protection task manager 545, a service bus identifier manager 550, a service bus connection manager 555, a service bus request manager 560, a proxy service manager 565, a node controller traffic manager 570, a service bus termination manager 575, or any combination thereof. Each of these components may communicate, directly or indirectly, with one another (e.g., via one or more buses, communications links, communications interfaces, or any combination thereof).

The node controller connection manager 525 may be configured as or otherwise support a means for establishing, at a taskchain controller of a DMS, a direct connection between the taskchain controller and a node controller of a first node cluster of a set of multiple node clusters, where the direct connection is based on a first network address of the node controller, where the set of multiple node clusters are associated with a respective set of multiple tenants of the DMS, where the taskchain controller of the DMS is operable to schedule data protection tasks for the set of multiple node clusters. The new node manager 530 may be configured as or otherwise support a means for sending, from the taskchain controller to the node controller via the direct connection, a request to add a node to the first node cluster. The node addressing manager 535 may be configured as or otherwise support a means for identifying, based on sending the request, a second network address associated with the first node cluster via which to route one or more data protection tasks from the taskchain controller to the node.

In some examples, the node identifier manager 540 may be configured as or otherwise support a means for receiving, at the taskchain controller from the node controller and in response to the request, an indication of an identifier for the node. In some examples, the data protection task manager 545 may be configured as or otherwise support a means for sending, from the taskchain controller directly to the second network address, a control message that indicates to perform a data protection task at the node, where the control message indicates the identifier for the node.

In some examples, to support sending the control message, the data protection task manager 545 may be configured as or otherwise support a means for sending the control message via the direct connection to a proxy service at the node controller for routing to the node based on the identifier, where the second network address is a same network address as the first network address.

In some examples, to support receiving the indication of the second network address, the service bus identifier manager 550 may be configured as or otherwise support a means for receiving an indication of the second network address for a second node of the first node cluster. In some examples, to support receiving the indication of the second network address, the service bus connection manager 555 may be configured as or otherwise support a means for establishing a second direct connection between the taskchain controller and the second node based on the second network address, where the control message is sent via the second direct connection.

In some examples, the service bus request manager 560 may be configured as or otherwise support a means for sending, from the taskchain controller to the node controller via the direct connection, a second request to add a service bus for the first node cluster, where reception of the indication of the second network address is responsive to the second request, and where the second node is the service bus.

In some examples, the service bus request manager 560 may be configured as or otherwise support a means for identifying a traffic load at the node controller exceeds a threshold, where sending the second request is based on identifying the traffic load at the node controller exceeds the threshold.

In some examples, the node controller traffic manager 570 may be configured as or otherwise support a means for identifying a traffic load at the node controller is below a threshold. In some examples, the service bus termination manager 575 may be configured as or otherwise support a means for sending, to the node controller via the direct connection, a third request to remove the service bus based on identifying the traffic load at the node controller is below the threshold. In some examples, the service bus termination manager 575 may be configured as or otherwise support a means for terminating the second direct connection based on identifying the traffic load at the node controller is below the threshold.

In some examples, the proxy service manager 565 may be configured as or otherwise support a means for receiving, at the taskchain controller from the node controller, an indication of a proxy service at the node controller via which to route the one or more data protection tasks from the taskchain controller to the node. In some examples, the data protection task manager 545 may be configured as or otherwise support a means for sending, from the taskchain controller to the proxy service via the direct connection, a second control message that indicates to perform a second data protection task at the node, where the second control message indicates the identifier for the node.

In some examples, the node controller traffic manager 570 may be configured as or otherwise support a means for identifying a traffic load at the node controller exceeds a threshold. In some examples, the data protection task manager 545 may be configured as or otherwise support a means for sending, from the taskchain controller to the second node via the second direct connection, a third control message that indicates to perform a third data protection task at the node, where the third control message indicates the identifier for the node.

In some examples, the new node manager 530 may be configured as or otherwise support a means for sending, from the taskchain controller to the node controller via the direct connection, a second request to add a second node to the first node cluster. In some examples, the node identifier manager 540 may be configured as or otherwise support a means for receiving, at the taskchain controller from the node controller and in response to the request, an indication of a second identifier for the second node. In some examples, the data protection task manager 545 may be configured as or otherwise support a means for sending, from the taskchain controller directly to the second network address, a second control message that indicates to perform a second data protection task at the second node, where the second control message indicates the identifier for the second node.

In some examples, the control message includes a transmission control protocol packet.

In some examples, the data protection task includes at least one of a write operation or a read operation.

Figure 6:
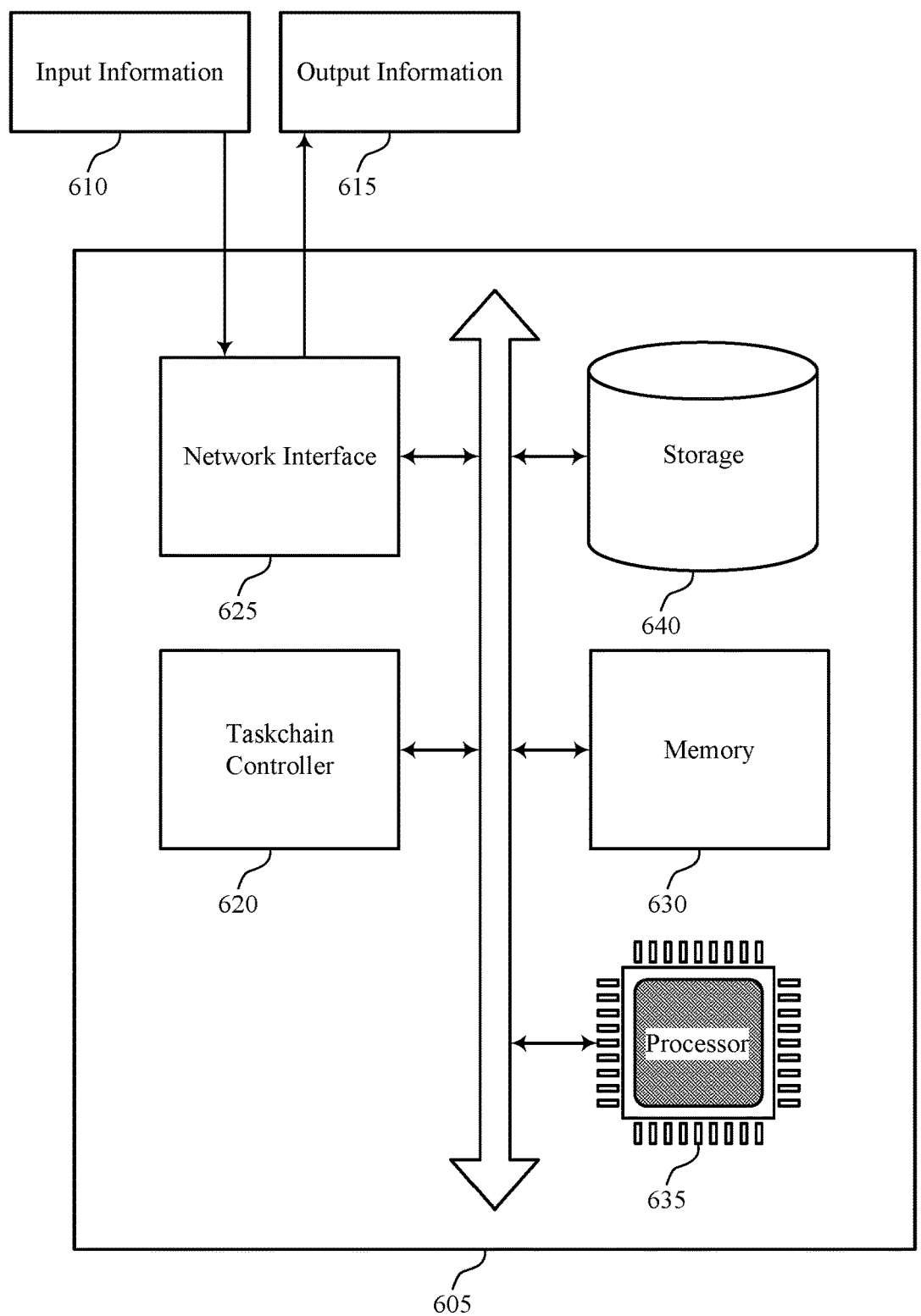
FIG. 6 shows a diagram of a system including a device that supports reliable and high-performance connectivity between control-planes and data-planes for a data management system in accordance with aspects of the present disclosure.

FIG. 6 shows a block diagram 600 of a system 605 that supports reliable and high-performance connectivity between control-planes and data-planes for a DMS in accordance with aspects of the present disclosure. The system 605 may be an example of or include the components of a system 405 as described herein. The system 605 may include components for data management, including components such as a taskchain controller 620, an input information 610, an output information 615, a network interface 625, a memory 630, a processor 635, and a storage 640. These components may be in electronic communication or otherwise coupled with each other (e.g., operatively, communicatively, functionally, electronically, electrically; via one or more buses, communications links, communications interfaces, or any combination thereof). Additionally, the components of the system 605 may include corresponding physical components or may be implemented as corresponding virtual components (e.g., components of one or more virtual machines). In some examples, the system 605 may be an example of aspects of one or more components described with reference to FIG. 1, such as a DMS 110.

The network interface 625 may enable the system 605 to exchange information (e.g., input information 610, output information 615, or both) with other systems or devices (not shown). For example, the network interface 625 may enable the system 605 to connect to a network (e.g., a network 120 as described herein). The network interface 625 may include one or more wireless network interfaces, one or more wired network interfaces, or any combination thereof. In some examples, the network interface 625 may be an example of may be an example of aspects of one or more components described with reference to FIG. 1, such as one or more network interfaces 165.

Memory 630 may include RAM, ROM, or both. The memory 630 may store computer-readable, computer-executable software including instructions that, when executed, cause the processor 635 to perform various functions described herein. In some cases, the memory 630 may contain, among other things, a basic input/output system (BIOS), which may control basic hardware or software operation such as the interaction with peripheral components or devices. In some cases, the memory 630 may be an example of aspects of one or more components described with reference to FIG. 1, such as one or more memories 175.

The processor 635 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 635 may be configured to execute computer-readable instructions stored in a memory 630 to perform various functions (e.g., functions or tasks supporting reliable and high-performance connectivity between control-planes and data-planes for a DMS). Though a single processor 635 is depicted in the example of FIG. 6, it is to be understood that the system 605 may include any quantity of one or more of processors 635 and that a group of processors 635 may collectively perform one or more functions ascribed herein to a processor, such as the processor 635. In some cases, the processor 635 may be an example of aspects of one or more components described with reference to FIG. 1, such as one or more processors 170.

Storage 640 may be configured to store data that is generated, processed, stored, or otherwise used by the system 605. In some cases, the storage 640 may include one or more HDDs, one or more SDDs, or both. In some examples, the storage 640 may be an example of a single database, a distributed database, multiple distributed databases, a data store, a data lake, or an emergency backup database. In some examples, the storage 640 may be an example of one or more components described with reference to FIG. 1, such as one or more network disks 180.

For example, the taskchain controller 620 may be configured as or otherwise support a means for establishing, at a taskchain controller of a DMS, a direct connection between the taskchain controller and a node controller of a first node cluster of a set of multiple node clusters, where the direct connection is based on a first network address of the node controller, where the set of multiple node clusters are associated with a respective set of multiple tenants of the DMS, where the taskchain controller of the DMS is operable to schedule data protection tasks for the set of multiple node clusters. The taskchain controller 620 may be configured as or otherwise support a means for sending, from the taskchain controller to the node controller via the direct connection, a request to add a node to the first node cluster. The taskchain controller 620 may be configured as or otherwise support a means for identifying, based on sending the request, a second network address associated with the first node cluster via which to route one or more data protection tasks from the taskchain controller to the node.

By including or configuring the taskchain controller 620 in accordance with examples as described herein, the system 605 may support techniques for reliable and high-performance connectivity between control-planes and data-planes for a DMS, which may provide one or more benefits such as, for example, improved reliability, reduced latency, improved scalability, and improved security, among other possibilities.

Figure 7:
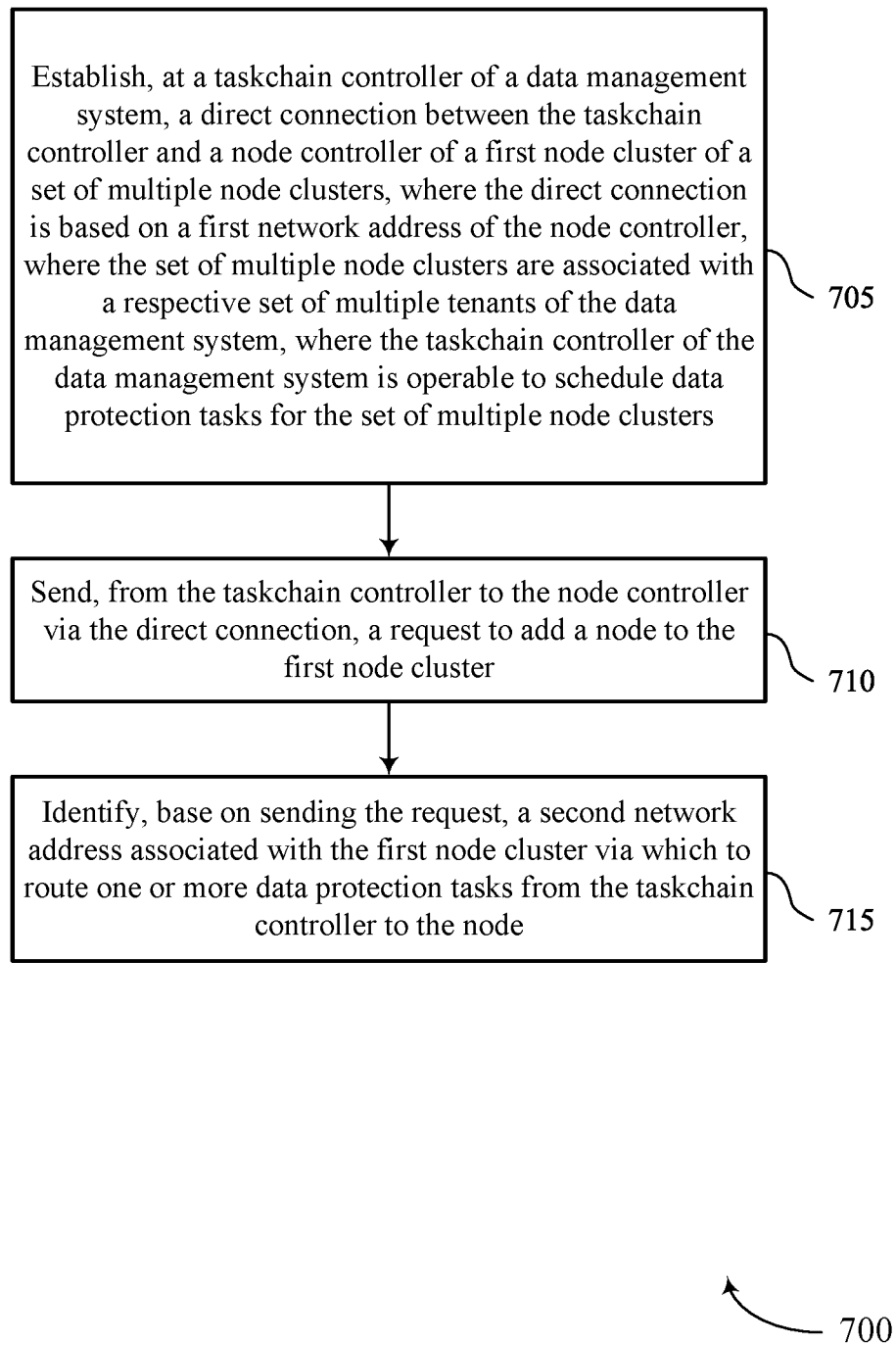
FIGS. 7 through 10 show flowcharts illustrating methods that support reliable and high-performance connectivity between control-planes and data-planes for a data management system in accordance with aspects of the present disclosure.

FIG. 7 shows a flowchart illustrating a method 700 that supports reliable and high-performance connectivity between control-planes and data-planes for a DMS in accordance with aspects of the present disclosure. The operations of the method 700 may be implemented by a DMS or its components as described herein. For example, the operations of the method 700 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 705, the method may include establishing, at a taskchain controller of a DMS, a direct connection between the taskchain controller and a node controller of a first node cluster of a set of multiple node clusters, where the direct connection is based on a first network address of the node controller, where the set of multiple node clusters are associated with a respective set of multiple tenants of the DMS, where the taskchain controller of the DMS is operable to schedule data protection tasks for the set of multiple node clusters. The operations of block 705 may be performed in accordance with examples as disclosed herein. In some examples, aspects of the operations of 705 may be performed by a node controller connection manager 525 as described with reference to FIG. 5.

At 710, the method may include sending, from the taskchain controller to the node controller via the direct connection, a request to add a node to the first node cluster. The operations of block 710 may be performed in accordance with examples as disclosed herein. In some examples, aspects of the operations of 710 may be performed by a new node manager 530 as described with reference to FIG. 5.

At 715, the method may include identifying, based on sending the request, a second network address associated with the first node cluster via which to route one or more data protection tasks from the taskchain controller to the node. The operations of block 715 may be performed in accordance with examples as disclosed herein. In some examples, aspects of the operations of 715 may be performed by a node addressing manager 535 as described with reference to FIG. 5.

Figure 8:
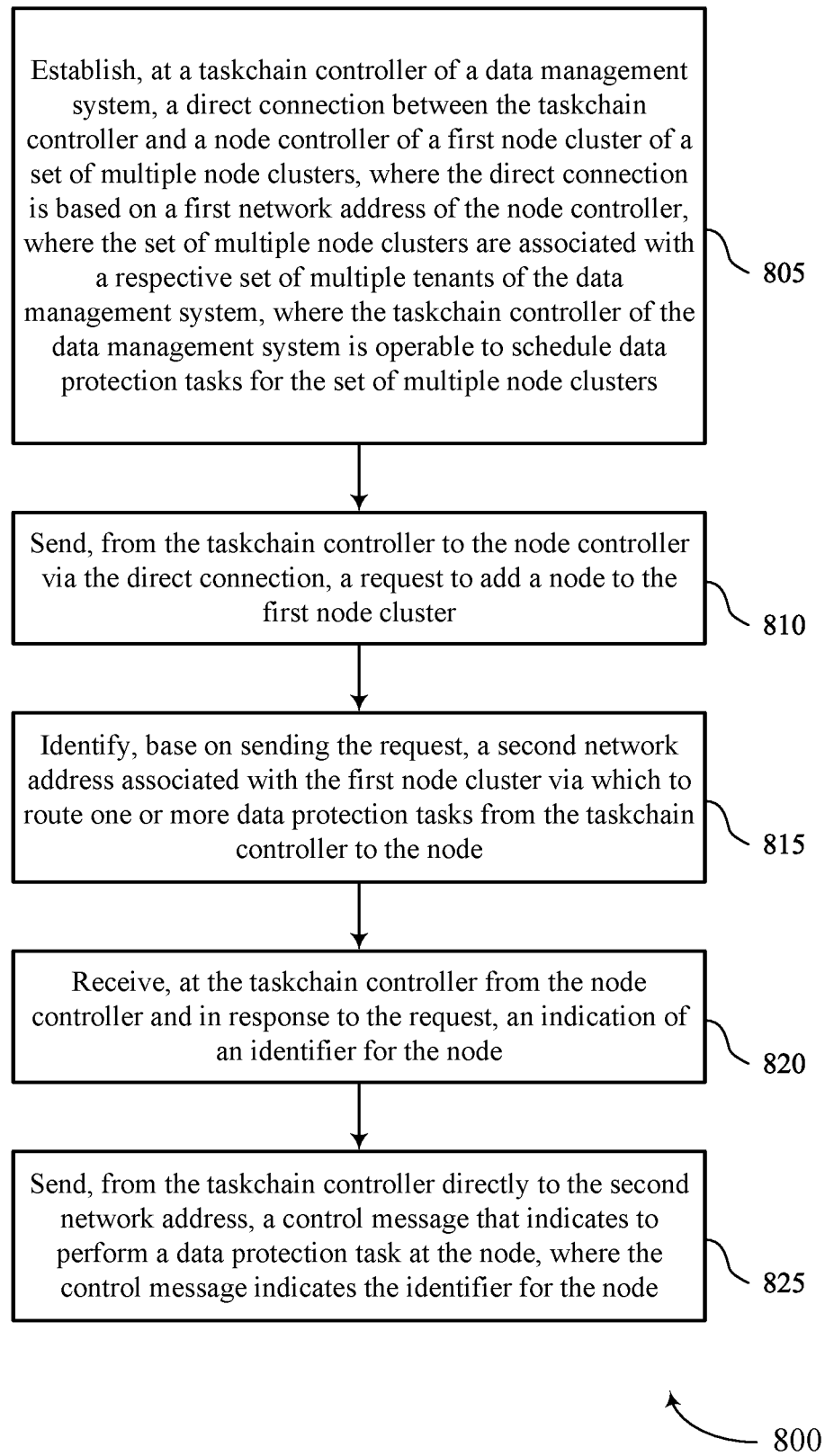

FIG. 8 shows a flowchart illustrating a method 800 that supports reliable and high-performance connectivity between control-planes and data-planes for a DMS in accordance with aspects of the present disclosure. The operations of the method 800 may be implemented by a DMS or its components as described herein. For example, the operations of the method 800 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 805, the method may include establishing, at a taskchain controller of a DMS, a direct connection between the taskchain controller and a node controller of a first node cluster of a set of multiple node clusters, where the direct connection is based on a first network address of the node controller, where the set of multiple node clusters are associated with a respective set of multiple tenants of the DMS, where the taskchain controller of the DMS is operable to schedule data protection tasks for the set of multiple node clusters. The operations of block 805 may be performed in accordance with examples as disclosed herein. In some examples, aspects of the operations of 805 may be performed by a node controller connection manager 525 as described with reference to FIG. 5.

At 810, the method may include sending, from the taskchain controller to the node controller via the direct connection, a request to add a node to the first node cluster. The operations of block 810 may be performed in accordance with examples as disclosed herein. In some examples, aspects of the operations of 810 may be performed by a new node manager 530 as described with reference to FIG. 5.

At 815, the method may include identifying, based on sending the request, a second network address associated with the first node cluster via which to route one or more data protection tasks from the taskchain controller to the node. The operations of block 815 may be performed in accordance with examples as disclosed herein. In some examples, aspects of the operations of 815 may be performed by a node addressing manager 535 as described with reference to FIG. 5.

At 820, the method may include receiving, at the taskchain controller from the node controller and in response to the request, an indication of an identifier for the node. The operations of block 820 may be performed in accordance with examples as disclosed herein. In some examples, aspects of the operations of 820 may be performed by a node identifier manager 540 as described with reference to FIG. 5.

At 825, the method may include sending, from the taskchain controller directly to the second network address, a control message that indicates to perform a data protection task at the node, where the control message indicates the identifier for the node. The operations of block 825 may be performed in accordance with examples as disclosed herein. In some examples, aspects of the operations of 825 may be performed by a data protection task manager 545 as described with reference to FIG. 5.

Figure 9:
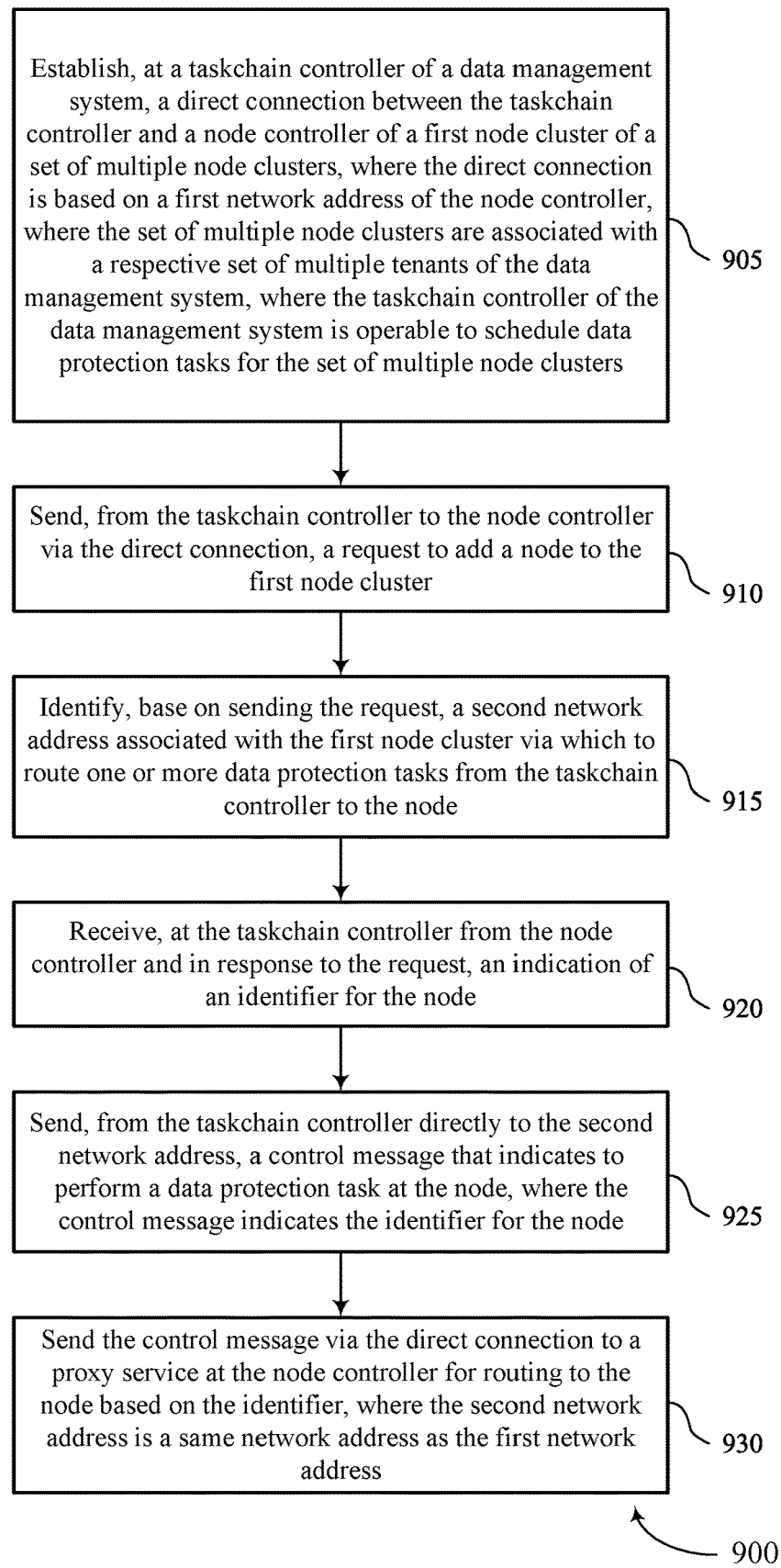

FIG. 9 shows a flowchart illustrating a method 900 that supports reliable and high-performance connectivity between control-planes and data-planes for a DMS in accordance with aspects of the present disclosure. The operations of the method 900 may be implemented by a DMS or its components as described herein. For example, the operations of the method 900 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 905, the method may include establishing, at a taskchain controller of a DMS, a direct connection between the taskchain controller and a node controller of a first node cluster of a set of multiple node clusters, where the direct connection is based on a first network address of the node controller, where the set of multiple node clusters are associated with a respective set of multiple tenants of the DMS, where the taskchain controller of the DMS is operable to schedule data protection tasks for the set of multiple node clusters. The operations of block 905 may be performed in accordance with examples as disclosed herein. In some examples, aspects of the operations of 905 may be performed by a node controller connection manager 525 as described with reference to FIG. 5.

At 910, the method may include sending, from the taskchain controller to the node controller via the direct connection, a request to add a node to the first node cluster. The operations of block 910 may be performed in accordance with examples as disclosed herein. In some examples, aspects of the operations of 910 may be performed by a new node manager 530 as described with reference to FIG. 5.

At 915, the method may include identifying, based on sending the request, a second network address associated with the first node cluster via which to route one or more data protection tasks from the taskchain controller to the node. The operations of block 915 may be performed in accordance with examples as disclosed herein. In some examples, aspects of the operations of 915 may be performed by a node addressing manager 535 as described with reference to FIG. 5.

At 920, the method may include receiving, at the taskchain controller from the node controller and in response to the request, an indication of an identifier for the node. The operations of block 920 may be performed in accordance with examples as disclosed herein. In some examples, aspects of the operations of 920 may be performed by a node identifier manager 540 as described with reference to FIG. 5.

At 925, the method may include sending, from the taskchain controller directly to the second network address, a control message that indicates to perform a data protection task at the node, where the control message indicates the identifier for the node. The operations of block 925 may be performed in accordance with examples as disclosed herein. In some examples, aspects of the operations of 925 may be performed by a data protection task manager 545 as described with reference to FIG. 5.

At 930, the method may include sending the control message via the direct connection to a proxy service at the node controller for routing to the node based on the identifier, where the second network address is a same network address as the first network address. The operations of block 930 may be performed in accordance with examples as disclosed herein. In some examples, aspects of the operations of 930 may be performed by a data protection task manager 545 as described with reference to FIG. 5.

Figure 10:
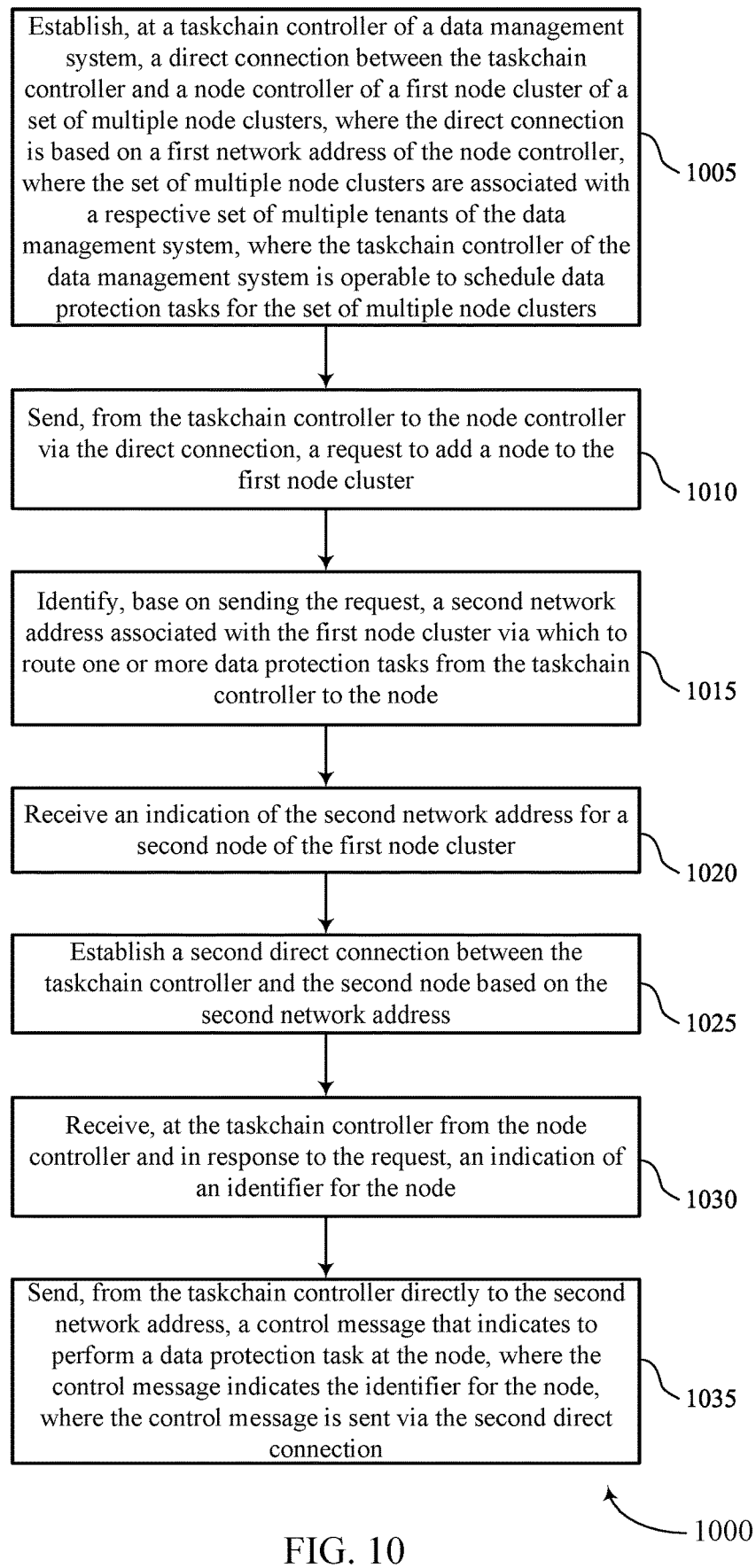

FIG. 10 shows a flowchart illustrating a method 1000 that supports reliable and high-performance connectivity between control-planes and data-planes for a DMS in accordance with aspects of the present disclosure. The operations of the method 1000 may be implemented by a DMS or its components as described herein. For example, the operations of the method 1000 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 1005, the method may include establishing, at a taskchain controller of a DMS, a direct connection between the taskchain controller and a node controller of a first node cluster of a set of multiple node clusters, where the direct connection is based on a first network address of the node controller, where the set of multiple node clusters are associated with a respective set of multiple tenants of the DMS, where the taskchain controller of the DMS is operable to schedule data protection tasks for the set of multiple node clusters. The operations of block 1005 may be performed in accordance with examples as disclosed herein. In some examples, aspects of the operations of 1005 may be performed by a node controller connection manager 525 as described with reference to FIG. 5.

At 1010, the method may include sending, from the taskchain controller to the node controller via the direct connection, a request to add a node to the first node cluster. The operations of block 1010 may be performed in accordance with examples as disclosed herein. In some examples, aspects of the operations of 1010 may be performed by a new node manager 530 as described with reference to FIG. 5.

At 1015, the method may include identifying, based on sending the request, a second network address associated with the first node cluster via which to route one or more data protection tasks from the taskchain controller to the node. The operations of block 1015 may be performed in accordance with examples as disclosed herein. In some examples, aspects of the operations of 1015 may be performed by a node addressing manager 535 as described with reference to FIG. 5.

At 1020, the method may include receiving an indication of the second network address for a second node of the first node cluster. The operations of block 1020 may be performed in accordance with examples as disclosed herein. In some examples, aspects of the operations of 1020 may be performed by a service bus identifier manager 550 as described with reference to FIG. 5.

At 1025, the method may include establishing a second direct connection between the taskchain controller and the second node based on the second network address. The operations of block 1025 may be performed in accordance with examples as disclosed herein. In some examples, aspects of the operations of 1025 may be performed by a service bus connection manager 555 as described with reference to FIG. 5.

At 1030, the method may include receiving, at the taskchain controller from the node controller and in response to the request, an indication of an identifier for the node. The operations of block 1030 may be performed in accordance with examples as disclosed herein. In some examples, aspects of the operations of 1030 may be performed by a node identifier manager 540 as described with reference to FIG. 5.

At 1035, the method may include sending, from the taskchain controller directly to the second network address, a control message that indicates to perform a data protection task at the node, where the control message indicates the identifier for the node, where the control message is sent via the second direct connection. The operations of block 1035 may be performed in accordance with examples as disclosed herein. In some examples, aspects of the operations of 1035 may be performed by a data protection task manager 545 as described with reference to FIG. 5.

A method is described. The method may include establishing, at a taskchain controller of a DMS, a direct connection between the taskchain controller and a node controller of a first node cluster of a set of multiple node clusters, where the direct connection is based on a first network address of the node controller, where the set of multiple node clusters are associated with a respective set of multiple tenants of the DMS, where the taskchain controller of the DMS is operable to schedule data protection tasks for the set of multiple node clusters, sending, from the taskchain controller to the node controller via the direct connection, a request to add a node to the first node cluster, and identifying, based on sending the request, a second network address associated with the first node cluster via which to route one or more data protection tasks from the taskchain controller to the node.

An apparatus is described. The apparatus may include a processor, memory coupled with the processor, and instructions stored in the memory. The instructions may be executable by the processor to cause the apparatus to establish, at a taskchain controller of a DMS, a direct connection between the taskchain controller and a node controller of a first node cluster of a set of multiple node clusters, where the direct connection is based on a first network address of the node controller, where the set of multiple node clusters are associated with a respective set of multiple tenants of the DMS, where the taskchain controller of the DMS is operable to schedule data protection tasks for the set of multiple node clusters, send, from the taskchain controller to the node controller via the direct connection, a request to add a node to the first node cluster, and identifying, based on sending the request, a second network address associated with the first node cluster via which to route one or more data protection tasks from the taskchain controller to the node.

Another apparatus is described. The apparatus may include means for establishing, at a taskchain controller of a DMS, a direct connection between the taskchain controller and a node controller of a first node cluster of a set of multiple node clusters, where the direct connection is based on a first network address of the node controller, where the set of multiple node clusters are associated with a respective set of multiple tenants of the DMS, where the taskchain controller of the DMS is operable to schedule data protection tasks for the set of multiple node clusters, means for sending, from the taskchain controller to the node controller via the direct connection, a request to add a node to the first node cluster, and means for identifying, based on sending the request, a second network address associated with the first node cluster via which to route one or more data protection tasks from the taskchain controller to the node.

A non-transitory computer-readable medium storing code is described. The code may include instructions executable by a processor to establish, at a taskchain controller of a DMS, a direct connection between the taskchain controller and a node controller of a first node cluster of a set of multiple node clusters, where the direct connection is based on a first network address of the node controller, where the set of multiple node clusters are associated with a respective set of multiple tenants of the DMS, where the taskchain controller of the DMS is operable to schedule data protection tasks for the set of multiple node clusters, send, from the taskchain controller to the node controller via the direct connection, a request to add a node to the first node cluster, and identifying, based on sending the request, a second network address associated with the first node cluster via which to route one or more data protection tasks from the taskchain controller to the node.

Some examples of the method, apparatuses, and non-transitory computer-readable medium described herein may further include operations, features, means, or instructions for receiving, at the taskchain controller from the node controller and in response to the request, an indication of an identifier for the node and sending, from the taskchain controller directly to the second network address, a control message that indicates to perform a data protection task at the node, where the control message indicates the identifier for the node.

In some examples of the method, apparatuses, and non-transitory computer-readable medium described herein, sending the control message may include operations, features, means, or instructions for sending the control message via the direct connection to a proxy service at the node controller for routing to the node based on the identifier, where the second network address may be a same network address as the first network address.

In some examples of the method, apparatuses, and non-transitory computer-readable medium described herein, receiving the indication of the second network address may include operations, features, means, or instructions for receiving an indication of the second network address for a second node of the first node cluster and establishing a second direct connection between the taskchain controller and the second node based on the second network address, where the control message may be sent via the second direct connection.

Some examples of the method, apparatuses, and non-transitory computer-readable medium described herein may further include operations, features, means, or instructions for sending, from the taskchain controller to the node controller via the direct connection, a second request to add a service bus for the first node cluster, where reception of the indication of the second network address may be responsive to the second request, and where the second node may be the service bus.

Some examples of the method, apparatuses, and non-transitory computer-readable medium described herein may further include operations, features, means, or instructions for identifying a traffic load at the node controller exceeds a threshold, where sending the second request may be based on identifying the traffic load at the node controller exceeds the threshold.

Some examples of the method, apparatuses, and non-transitory computer-readable medium described herein may further include operations, features, means, or instructions for identifying a traffic load at the node controller may be below a threshold, sending, to the node controller via the direct connection, a third request to remove the service bus based on identifying the traffic load at the node controller may be below the threshold, and terminating the second direct connection based on identifying the traffic load at the node controller may be below the threshold.

Some examples of the method, apparatuses, and non-transitory computer-readable medium described herein may further include operations, features, means, or instructions for receiving, at the taskchain controller from the node controller, an indication of a proxy service at the node controller via which to route the one or more data protection tasks from the taskchain controller to the node and sending, from the taskchain controller to the proxy service via the direct connection, a second control message that indicates to perform a second data protection task at the node, where the second control message indicates the identifier for the node.

Some examples of the method, apparatuses, and non-transitory computer-readable medium described herein may further include operations, features, means, or instructions for identifying a traffic load at the node controller exceeds a threshold and sending, from the taskchain controller to the second node via the second direct connection, a third control message that indicates to perform a third data protection task at the node, where the third control message indicates the identifier for the node.

Some examples of the method, apparatuses, and non-transitory computer-readable medium described herein may further include operations, features, means, or instructions for sending, from the taskchain controller to the node controller via the direct connection, a second request to add a second node to the first node cluster, receiving, at the taskchain controller from the node controller and in response to the request, an indication of a second identifier for the second node, and sending, from the taskchain controller directly to the second network address, a second control message that indicates to perform a second data protection task at the second node, where the second control message indicates the identifier for the second node.

In some examples of the method, apparatuses, and non-transitory computer-readable medium described herein, the control message includes a transmission control protocol packet.

In some examples of the method, apparatuses, and non-transitory computer-readable medium described herein, the data protection task includes at least one of a write operation or a read operation.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
establishing, at a taskchain controller of a data management system, a direct connection between the taskchain controller and a node controller of a first node cluster of a plurality of node clusters, wherein the direct connection is based on a first network address of the node controller, wherein the plurality of node clusters are associated with a respective plurality of tenants of the data management system, wherein the taskchain controller of the data management system is operable to schedule data protection tasks for the plurality of node clusters;
sending, from the taskchain controller to the node controller via the direct connection, a request to add a node to the first node cluster; and
identifying, based on sending the request, a second network address associated with the first node cluster via which to route one or more data protection tasks from the taskchain controller to the node.

2. The method of claim 1, further comprising:
receiving, at the taskchain controller from the node controller and in response to the request, an indication of an identifier for the node; and
sending, from the taskchain controller directly to the second network address, a control message that indicates to perform a data protection task at the node, wherein the control message indicates the identifier for the node.

3. The method of claim 2, wherein sending the control message comprises:
sending the control message via the direct connection to a proxy service at the node controller for routing to the node based at least in part on the identifier, wherein the second network address is a same network address as the first network address.

4. The method of claim 2, wherein identifying the second network address comprises:
receiving an indication of the second network address for a second node of the first node cluster; and
establishing a second direct connection between the taskchain controller and the second node based on the second network address, wherein the control message is sent via the second direct connection.

5. The method of claim 4, further comprising:
sending, from the taskchain controller to the node controller via the direct connection, a second request to add a service bus for the first node cluster, wherein reception of the indication of the second network address is responsive to the second request, and wherein the second node is the service bus.

6. The method of claim 5, further comprising:
identifying a traffic load at the node controller exceeds a threshold, wherein sending the second request is based at least in part on identifying the traffic load at the node controller exceeds the threshold.

7. The method of claim 5, further comprising:
identifying a traffic load at the node controller is below a threshold;
sending, to the node controller via the direct connection, a third request to remove the service bus based at least in part on identifying the traffic load at the node controller is below the threshold; and
terminating the second direct connection based at least in part on identifying the traffic load at the node controller is below the threshold.

8. The method of claim 4, further comprising:
receiving, at the taskchain controller from the node controller, an indication of a proxy service at the node controller via which to route the one or more data protection tasks from the taskchain controller to the node; and
sending, from the taskchain controller to the proxy service via the direct connection, a second control message that indicates to perform a second data protection task at the node, wherein the second control message indicates the identifier for the node.

9. The method of claim 8, further comprising:
identifying a traffic load at the node controller exceeds a threshold; and
sending, from the taskchain controller to the second node via the second direct connection, a third control message that indicates to perform a third data protection task at the node, wherein the third control message indicates the identifier for the node.

10. The method of claim 2, further comprising:
sending, from the taskchain controller to the node controller via the direct connection, a second request to add a second node to the first node cluster;
receiving, at the taskchain controller from the node controller and in response to the request, an indication of a second identifier for the second node; and
sending, from the taskchain controller directly to the second network address, a second control message that indicates to perform a second data protection task at the second node, wherein the second control message indicates the identifier for the second node.

11. The method of claim 2, wherein the control message comprises a transmission control protocol packet.

12. The method of claim 2, wherein the data protection task comprises at least one of a write operation or a read operation.

13. An apparatus, comprising:
at least one processor;
memory coupled with the at least one processor; and
instructions stored in the memory and executable by the at least one processor to cause the apparatus to:
establish, at a taskchain controller of a data management system, a direct connection between the taskchain controller and a node controller of a first node cluster of a plurality of node clusters, wherein the direct connection is based on a first network address of the node controller, wherein the plurality of node clusters are associated with a respective plurality of tenants of the data management system, wherein the taskchain controller of the data management system is operable to schedule data protection tasks for the plurality of node clusters;
send, from the taskchain controller to the node controller via the direct connection, a request to add a node to the first node cluster; and
identify, based on sending the request, a second network address associated with the first node cluster via which to route one or more data protection tasks from the taskchain controller to the node.

14. The apparatus of claim 13, wherein the instructions are further executable by the at least one processor to cause the apparatus to:

receive, at the taskchain controller from the node controller and in response to the request, an indication of an identifier for the node; and send, from the taskchain controller directly to the second network address, a control message that indicates to perform a data protection task at the node, wherein the control message indicates the identifier for the node.

15. The apparatus of claim 14, wherein the instructions to send the control message are executable by the at least one processor to cause the apparatus to:

send the control message via the direct connection to a proxy service at the node controller for routing to the node based at least in part on the identifier, wherein the second network address is a same network address as the first network address.

16. The apparatus of claim 14, wherein the instructions to identify the second network address are executable by the at least one processor to cause the apparatus to:

receive an indication of the second network address for a second node of the first node cluster; and establish a second direct connection between the taskchain controller and the second node based on the second network address, wherein the control message is sent via the second direct connection.

17. The apparatus of claim 16, wherein the instructions are further executable by the at least one processor to cause the apparatus to:

send, from the taskchain controller to the node controller via the direct connection, a second request to add a service bus for the first node cluster, wherein reception of the indication of the second network address is responsive to the second request, and wherein the second node is the service bus.

18. The apparatus of claim 17, wherein the instructions are further executable by the at least one processor to cause the apparatus to:

identify a traffic load at the node controller exceeds a threshold, wherein sending the second request is based at least in part on identifying the traffic load at the node controller exceeds the threshold.

19. The apparatus of claim 17, wherein the instructions are further executable by the at least one processor to cause the apparatus to:

identify a traffic load at the node controller is below a threshold;

send, to the node controller via the direct connection, a third request to remove the service bus based at least in part on identifying the traffic load at the node controller is below the threshold; and terminate the second direct connection based at least in part on identifying the traffic load at the node controller is below the threshold.

20. A non-transitory computer-readable medium storing code, the code comprising instructions executable by at least one processor to:

establish, at a taskchain controller of a data management system, a direct connection between the taskchain controller and a node controller of a first node cluster of a plurality of node clusters, wherein the direct connection is based on a first network address of the node controller, wherein the plurality of node clusters are associated with a respective plurality of tenants of the data management system, wherein the taskchain controller of the data management system is operable to schedule data protection tasks for the plurality of node clusters;

send, from the taskchain controller to the node controller via the direct connection, a request to add a node to the first node cluster; and identify, based on sending the request, a second network address associated with the first node cluster via which to route one or more data protection tasks from the taskchain controller to the node.

* * * * *